United States Patent [19]
Suemura et al.

[11] Patent Number: 5,506,920
[45] Date of Patent: Apr. 9, 1996

[54] OPTICAL WAVELENGTH TUNABLE FILTER

[75] Inventors: Yoshihiko Suemura; Naoya Henmi; Akio Tajima, all of Tokyo; Haruo Takahashi; Hiroyuki Morimura, both of Kanagawa, all of Japan

[73] Assignee: NEC Corporation, Japan

[21] Appl. No.: 188,027

[22] Filed: Jan. 28, 1994

[30] Foreign Application Priority Data

Jan. 29, 1993 [JP] Japan ................................. 5-012981
Oct. 26, 1993 [JP] Japan ................................. 5-266714

[51] Int. Cl.$^6$ ................................................. G02B 6/26
[52] U.S. Cl. ......................................... 385/25; 385/23
[58] Field of Search ................................. 359/889, 230, 359/234, 236; 385/15–23, 25; 372/32

[56] References Cited

U.S. PATENT DOCUMENTS 3,944,947 3/1976 Pike et al. ................................. 372/32
3,967,211 6/1976 Itzkan et al. ............................. 372/32

Primary Examiner—Rodney B. Bovernick
Assistant Examiner—John Ngo
Attorney, Agent, or Firm—Laff, Whitesel, Conte & Saret

[57] ABSTRACT

An optical filter having a transmission wavelength to be tuned dependent on light incident angle is rotatively provided in a collimated light path. The optical filter is rotated by the displacement of a piezoelectric actuator by a structure in which the displacement is converted to the rotation of the optical filter. The converting structure comprises a displacement magnifying mechanism for magnifying the displacement to provide the magnified displacement and a motion converting mechanism for converting the magnified displacement to the rotation of the optical filter.

3 Claims, 2 Drawing Sheets

OPTICAL WAVELENGTH TUNABLE FILTER

FIELD OF THE INVENTION

This invention relates to an optical wavelength tunable filter, and more particularly to, an optical filter for transmitting light of a predetermined wavelength to be used in an optical communication system, an optical measurement system, etc.

BACKGROUND OF THE INVENTION

A conventional optical wavelength tunable filter comprises a prism or a grating for selecting a predetermined wavelength of light. In the filter using the prism, for instance, the prism is rotated dependent on a wavelength of light to be tuned.

However, the adjustment of light axis is difficult in the conventional optical wavelength tunable filter. As a result, the efficiency is low. Further, the prism is not high in resolution power. This leads to the difficulty of providing a sharply defined spectrum. Still further, the filter can not be small in size due to the configuration of the prism. The same disadvantages are found in the filter using the grating.

In order to overcome these disadvantages, an optical wavelength tunable filter using an interference filter has been proposed as described in the Japanese Patent Kokai No. 62-22034. In this optical wavelength tunable filter, the inference filter is fabricated as multilayered dielectric thin films. The interference film filter has a good spectrum property, and a transmission wavelength is tuned by varying a light incident angle thereto. In this optical wavelength tunable filter, an optics is of a light collimated type, so that there are advantages in that the light axis adjustment is easy to be carried out, the cost is low, the size is small, and the efficiency is high.

Such an optical wavelength tunable filter is used in the field of optical communication, as described before. In an optical communication system, for instance, the above described interference filter is used to select one wavelength division from a wavelength division multiplexed signal light or to exclude spontaneous emission light as noise from a signal light amplified by an optical amplifier.

In such an application, there are the demands or needs to electrically tune a transmission wavelength. In case of a wavelength division multiplexed communication system, for instance, it is necessary to change a transmission wavelength, and to lock an optical wavelength tunable filter, through which a predetermined wavelength is transmitted, so that a receiving channel is selected. On the other hand, in case where the wavelength of a transmission light is fluctuated largely as compared to a transmission bandwidth of an optical filter, it is necessary that a feedback signal is supplied to the optical filter to control the transmission wavelength therethrough.

For this purpose, an optical wavelength tunable filter in which an interference filter is varied in angle by a pulse motor has been proposed.

In the optical wavelength tunable filter using the pulse motor, however, there are disadvantages set out below.

(1) It is difficult to be made small in size.
(2) The continuous angle adjustment is not carried out due to the non-continuous rotation of a pulse motor, so that the fine adjustment of a transmission wavelength is not realized.
(3) The control mechanism is complicated, and it is not suitable to be applied to a servo-system.

SUMMARY OF THE INVENTION

Accordingly, it is an object of the invention to provide an optical wavelength tunable filter which is made small in size.

It is another object of the invention to provide an optical wavelength tunable filter in which the continuous and fine angle adjustment is carried out.

It is a further object of the invention to provide an optical wavelength tunable filter which is suitable to be applied to a servo-system.

According to the invention, an optical wavelength tunable filter, comprises:

an optical filter for transmitting a light of a predetermined wavelength band dependent on an incident angle of a collimated light propagated through a light path, the optical filter being rotatively positioned in the light path; and a piezoelectric actuator for generating a displacement dependent on an applied voltage;

means for converting the diplacement to a rotation of the optical filter.

BRIEF DESCRIPTION OF THE DRAWINGS

The invention will be explained in more detailed in conjunction with appended drawings, wherein.

DESCRIPTION OF THE PREFERRED EMBODIMENTS

Figure 1:
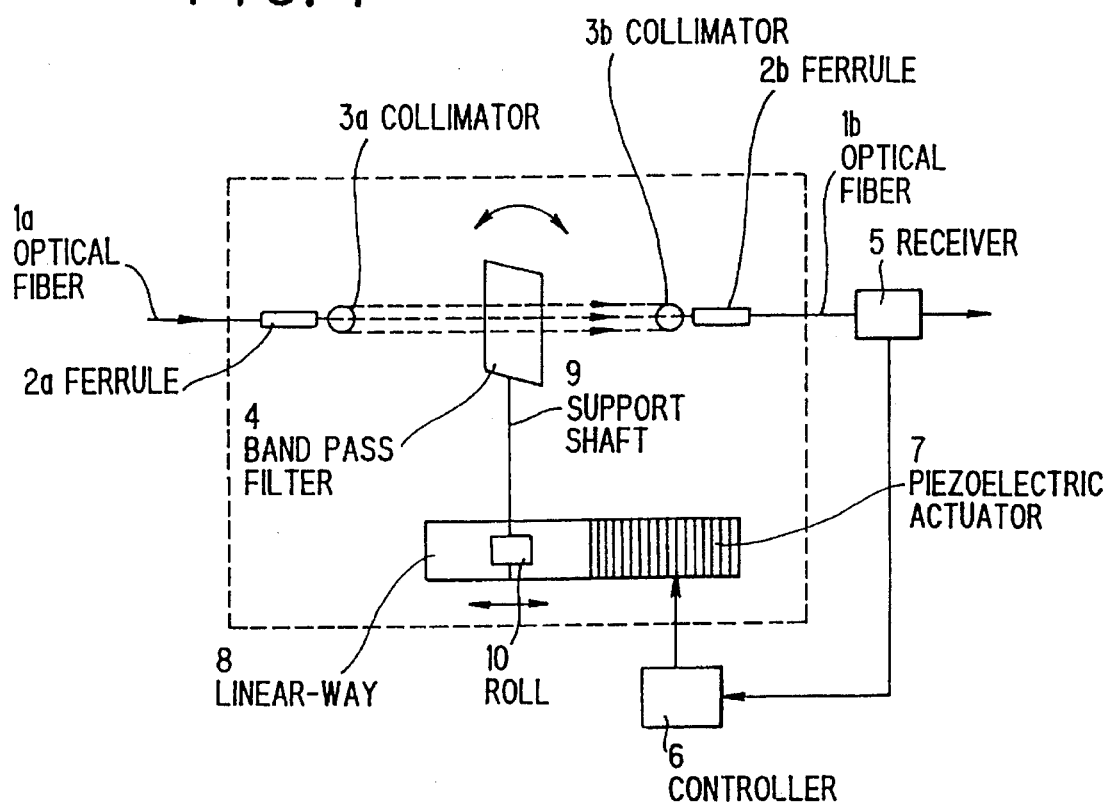
FIG. 1 is a block diagram showing an optical wavelength tunable filter in a preferred embodiment according to the invention.

FIG. 1 shows an optical wavelength tunable filter in the preferred embodiment which comprises an collimated light path comprising optical fibers 1a and 1b, ferrules 2a and 2b, and collimators 3a and 3b, a bandpass filter 4 comprising multilayered dielectric thin films to provide a sharply defined spectrum property having a bandwidth of 1 nm, an optical receiver 5 for receiving a transmission light, a controller 6 for determining a voltage by receiving a level signal from the receiver 5, an piezoelectric actuator 7 for generating a mechanical motion (displacement) by receiving a voltage determined in the controller 6, a linear-way 8 moving in the left and right directions responsive to the displacement of the piezoelectric actuator 7, a support shaft 9 for rotatively supporting the bandpass filter 4, and a roll 10 for converting the horizontal motion of the linear-way 8 to the rotation of the support shaft 9.

In this optical wavelength tunable filter, the piezoelectric actuator 7 is composed of multilayered piezoelectric elements to be shrinked and expanded responsive to the applied voltage which is controlled to make the level of the transmission light received in the receiver 5 maximum by the controller 6. The piezoelectric actuator 7 and the linear-way 8 is connected directly or indirectly via a motion magnifying structure.

In operation, it is assumed that a wavelength multiplexed signal light having channels $\lambda_1$ to $\lambda_4$ of wavelengths 1.540 μm, 1.550 μm and 1.555 μm each modulated in intensity by a bit rate of 1.2 Gb/s is propagated through the optical fiber 1a, and collimated to be supplied to the bandpass filter 4 by the collimator 3a. The band pass filter 4 is a interference filter having the band pass property of a transmission bandwidth 1 nm at the wavelength of 1.55 μm. In this preferred embodiment, the piezoelectric actuator 7 is assumed to be provided with the aforementioned motion magnifying structure, so that the horizontal extension of 500 μm is generated by varying the voltage applied to the piezoelectric actuator 7 to be 0 to 150 V. Consequently, this motion is transferred to the linear-way 8, so that a light incident angle to the band pass filter 4 is varied by the rotation thereof caused in accordance with the friction of the linear-way 8 and the roll 10. In this preferred embodiment, the diameter of the roll 10 is assumed to be 2 mm, so that the incident angle is varied at the maximum by approximately 30°. In accordance with the 30° rotation of the band pass filter 4, the transmission wavelength is varied 1.530 μm to 1.560 μm by 30 nm, so that the whole channels $\lambda_1$ to $\lambda_4$ can be covered. The transmission light is coupled via the collimator 3b and the ferrule 2b to the optical fiber 1b, through which the signal light is propagated to be received in the optical receiver 5. In this preferred embodiment, the portion encircled by the dotted line in FIG. 1 is fabricated in size to be as small as "65 mm×40 mm×40 mm". Consequently, the tracking of a wavelength is realized in accordance with the control of a voltage applied to the piezoelectric actuator 7 by the controller 6. Thus, even if a transmission wavelength is fluctuated, the transmission wavelength of the band pass filter 4 is controlled to be complied with the wavelength fluctuation continuously and finely.

Figure 2:
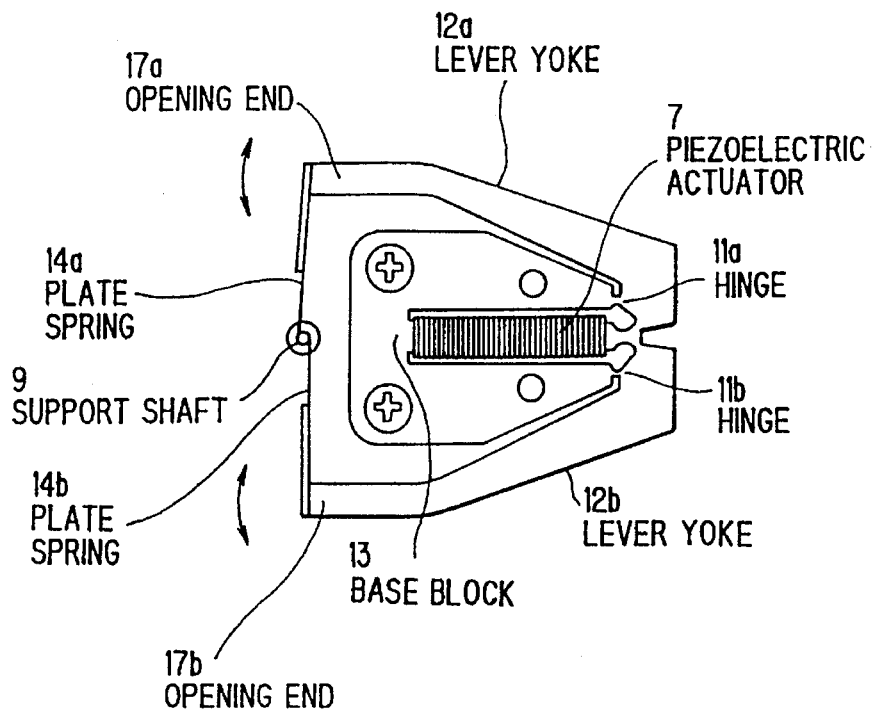
FIG. 2 is a plane view showing a piezoelectric actuator, and a structure for magnifying and transferring the motion of the piezoelectric actuator used in place of a linear-way and a roll in the preferred embodiment.

FIG. 2 shows a structure for magnifying and transferring the motion of the piezoelectric actuator 7 used in place of the linear-way 8, and the roll 10, wherein the magnifying and transferring structure operates with a very small load as compared to that of the linear-way 8 and the roll 10.

The magnifying and transferring structure comprises a pair of lever yokes 12a and 12b having hinges 11a and 11b, a base block 13, and opening ends 17a and 17b, and plate springs 14a and 14b fixed at one ends to the opening ends 17a and 17b of the lever yokes 12a and 12b and the other ends to the support shaft 9, wherein the piezoelectric actuator 7 is fixed at one end to the base block 13 and at an opposite end to the lever yokes 12a and 12b, so that the motion of the piezoelectric actuator 7 is magnified to be transferred to the plate springs 14 and 14 by the lever yokes 12a and 12b.

Figure 3:
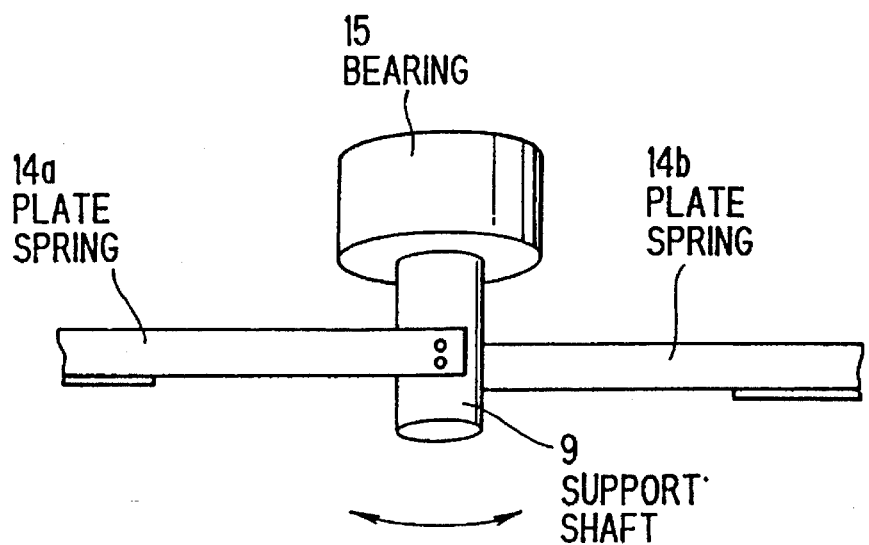
FIG. 3 is an enlarged explanatory view showing the relation of a support shaft of a band pass filter to plate springs in FIG. 2.

FIG. 3 shows the support shaft 9 which is supported by a bearing 15, and to which the plate springs 14a and 14b are welded by spots. In this structure, the amplified motions of the plate springs 14a and 14b are converted to the rotation of the support shaft 9 by parallel and opposite forces of the flexible plate springs 14a and 14b.

Figure 4:
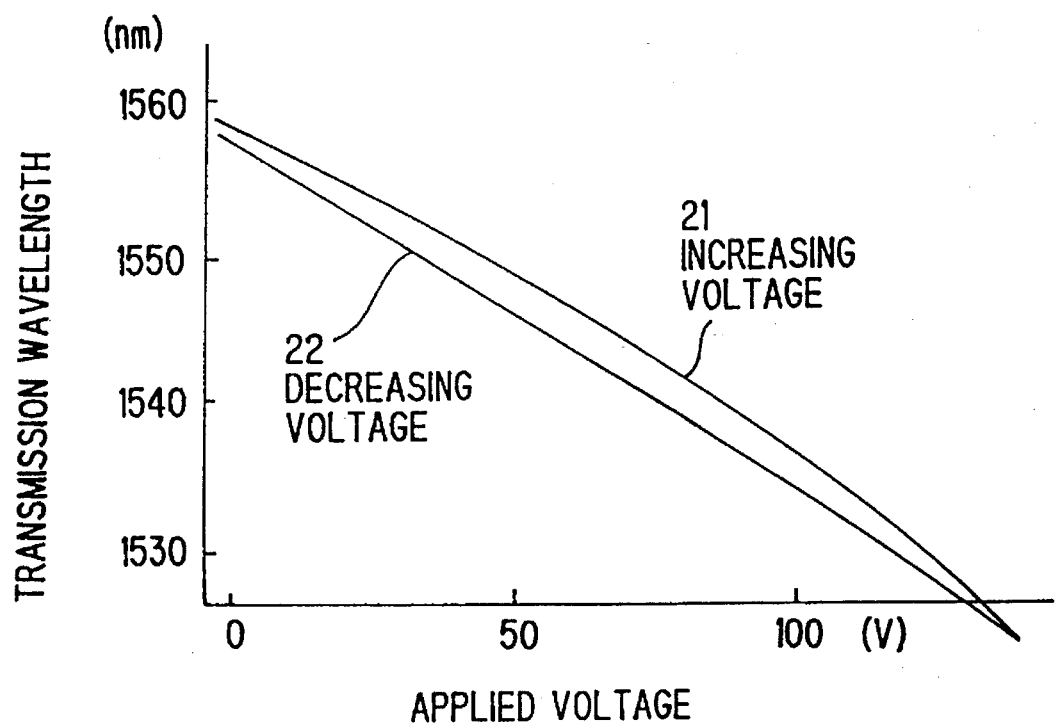
FIG. 4 is a graph representing wavelength relative to voltage applied to the piezoelectric actuator in the preferred embodiment.

FIG. 4 shows the relation of transmission wavelength to voltage applied to the piezoelectric actuator 7, wherein the case where the applied voltage is increased is shown by the curve 21, and the case where the applied voltage is decreased is shown by the curve 22. As apparent from the illustration, the both curves 21 and 22 are continuous to be proximate to each other to represent a well improved hysteresis property due to the extremely decreased driving load as explained before. In accordance with the decrease of the driving load, the continuous and high speed response property is obtained in the magnifying and transferring structure as shown in FIGS. 2 and 3 in a more improved manner than in the mechanism using the linear-way 8 and the roll 10 as shown in FIG. 1.

The magnifying and transferring structure may be replaced by a mechanism using a lack and pinion system, or a crank system. If a piezoelectric actuator having a large displacement amount is used, a magnifying structure is not necessary. In using such a large displacement piezoelectric actuator, one end thereof may be directly connected to a band pass filter.

The interference filter may be designed to have a transmission wavelength band of a 1.3 μm band, a 0.8 μm or other wavelength band, and a bandwidth of 0.5 nm, 0.3 nm or other values by changing the composition of dielectric films, and the thickness thereof.

If an optical filter having a short-wavelength-pass or long-wavelength-pass property is used, a plurality of channels can be selected simultaneously. As a matter of course, other optical filters than an interference filter may be used. For instance, if a solid etalon is used, a bandwidth of a transmission wavelength can be small (for instance, 0.01 nm, 0.1 nm, etc.) to be applied to a high density wavelength division multiplexed optical system.

In the preferred embodiment, the receiver 5 may be deleted to provide an open loop control circuit. In this circuit, the controller 6 may controls the piezoelectric actuator 7 to be applied with a control signal determined by a predetermined data, for instance, stored in a memory.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical wavelength tunable filter, comprising:

an optical filter for transmitting a light of a predetermined wavelength band dependent on an incident angle of a collimated light propagated through a light path, said optical filter being rotatively positioned in said light path; and a piezoelectric actuator for generating a displacement dependent on an applied voltage;

means for converting said displacement to a rotation of said optical filter, said converting means comprising a linear-way moving in a longitudinal direction in response to said displacement, a roll rotating responsive to a longitudinal motion of said linear-way, and a support shaft for rotatively supporting said optical filter, said support shaft being rotated responsive to a rotation of said roll to rotate said optical filter.

2. An optical wavelength tunable filter, comprising:

an optical filter for transmitting a light of a predetermined wavelength band dependent on an incident angle of a collimated light propagated through a light path, said optical filter being rotatively positioned in said light path;

a piezoelectric actuator for generating a displacement dependent on an applied voltage;

means for magnifying said displacement to provide a magnified displacement; said magnifying means comprises a pair of lever yokes symmetrically arranged in regard to said piezoelectric actuator, and defined to be connected at a closed base portion and free at opened tip ends, a leading point of said displacement of said piezoelectric actuator being connected to a vicinity of said closed base portion; and means for converting said displacement to a rotation of said optical filter; said converting means comprises a pair of flexible plate springs, each of said flexible plate springs being connected at one end to a corresponding one of said opened tip ends of said lever yokes and an opposite end to said optical filter.

3. An optical wavelength tunable filter, according to claim 2, wherein:

said optical filter is rotatively supported by a support shaft;

said each of said flexible plate springs is spot-welded at said opposite end to axially symmetrical surfaces of said support shaft.

* * * * *

UNITED STATES PATENT AND TRADEMARK OFFICE
CERTIFICATE OF CORRECTION

PATENT NO. : 5,506,920
DATED : April 9, 1996
INVENTOR(S) : Yoshihiko Suemura et al It is certified that error appears in the above-indentified patent and that said Letters Patent is hereby corrected as shown below:

On the title page, change item [73] to read:

Assignee: NEC Corporation and Koshin Kogaku, Ltd., both of Japan.

Signed and Sealed this

Twenty-second Day of July, 1997

*Attest:*

BRUCE LEHMAN

*Attesting Officer*     *Commissioner of Patents and Trademarks*